United States Patent
Yoshida et al.

(10) Patent No.: US 6,233,257 B1
(45) Date of Patent: May 15, 2001

(54) WIRELESS LOCAL LOOP AUTOMATIC DELAY SETTING

(75) Inventors: Satoshi Yoshida, Nice; Patrick Feyfant, Roulon; Varenka Martin; Laurent Winckel, both of Antibes; Philippe Gaglione, Mandelieu; Oliver Weigelt; Denis Archambaud, both of Antibes, all of (FR)

(73) Assignee: VLSI Technology, Inc., San Jose, CA (US)

( * ) Notice: Subject to any disclaimer, the term of this patent is extended or adjusted under 35 U.S.C. 154(b) by 0 days.

(21) Appl. No.: 08/943,324

(22) Filed: Oct. 3, 1997

(51) Int. Cl.$^7$ ........................................................ H04J 3/06
(52) U.S. Cl. ............................................ 370/508; 370/519
(58) Field of Search ..................................... 370/508, 519, 370/252, 337, 347, 345, 350; 375/356

(56) References Cited

U.S. PATENT DOCUMENTS

| | | | |
|---|---|---|---|
| 5,440,561 | * | 8/1995 | Werronen ............................. 370/105.1 |
| 5,448,570 | * | 9/1995 | Toda et al. ............................. 370/95.3 |
| 5,519,710 | * | 5/1996 | Otsuka .................................. 370/95.3 |
| 5,604,733 | * | 2/1997 | Hargrave ................................ 370/337 |
| 5,640,396 | * | 6/1997 | Cudak et al. ........................... 370/337 |
| 5,654,960 | * | 8/1997 | Kohlschmidt .......................... 370/337 |
| 5,745,484 | * | 4/1998 | Scott ...................................... 370/347 |
| 5,748,621 | * | 5/1998 | Masuda et al. ........................ 370/337 |
| 5,812,544 | * | 9/1998 | Dent ...................................... 370/337 |
| 5,914,947 | * | 6/1999 | Saito ...................................... 370/337 |
| 6,011,974 | * | 1/2000 | Cederval et al. ...................... 455/456 |

OTHER PUBLICATIONS

"Personal Handy Phone System ARIB Standard", Version 2, Dec. 26, 1995 Association of Radio Industries and Businesses (ARIB).

Takeshita et al., "Personal Handy–Phone System (PHS) Guidebook" Ministries of Posts and Telecommunications, Japan.

* cited by examiner

Primary Examiner—Douglas W. Olms
Assistant Examiner—Ken Vanderpuye
(74) Attorney, Agent, or Firm—Wagner Murabito & Hao LLP (57) ABSTRACT

A method and system that enables an automatic delay setting within a wireless local loop system. The present invention determines the transmission distance time delay existing between a base station and a personal station by employing the communication interface that is utilized between them. The main reason for determining the transmission time delay caused by large transmission distances (e.g., over 300 meters) existing between base stations and personal stations is to compensate for it. Once the transmission distance time delay is known, the personal station utilizes that value to compensate for it. Specifically, the present invention directs a base station to transmit a control signal to a personal station. The personal station receives the control signal and transmits a signal to the base station. The base station determines if it started to receive the signal from the personal station later than it expected the signal to arrive, assuming close proximity of the two stations. If the signal arrived when it was expected to arrive, the base station discontinues determining the transmission distance time delay. If the signal arrived later than expected, the base station calculates the time difference between the expected arrival time and the actual arrival of the signal. The time difference is equivalent to the transmission distance time delay. Once the time difference is determined, the base station then transmits it to the personal station. The personal station stores the transmission distance time delay value enabling it to compensate for it.

15 Claims, 10 Drawing Sheets

WIRELESS LOCAL LOOP AUTOMATIC DELAY SETTING

TECHNICAL FIELD

The present invention relates to the field of wireless telecommunications. More specifically, the present invention relates to providing an automatic transmission distance time delay setting within a wireless local loop system.

BACKGROUND ART

Within the field of wireless telecommunications systems there exists a system referred to as a wireless local loop system, otherwise known as WLL. The wireless local loop system is functionally designed to provide two way wireless communication to its users. A radio communication interface is utilized to enable personal stations and base stations to communicate with each other within the wireless local loop system.

One type of radio communication interface utilized within a wireless local loop system is the radio interface used within the personal handy phone system (PHS). When the transmission distance between a base station and a personal station is 300 meters or less within the radio interface of the personal handy phone system, the transmission time delay attributed to the distance can be ignored. But within the wireless local loop system, distances up to 7 kilometers can exist between a base station and a personal station which leads to transmission distance delays that should not be ignored. Transmission distance delays that occur within the wireless local loop system are compensated for within the personal station once the large transmission distance is determined. Every 651 meters of distance beyond the usual 300 meters contributes roughly 2.6 microseconds of unwanted delay.

The wireless local loop system has a disadvantage associated with the process of determining the value of the transmission distance time delay that exists between a specific personal station and its corresponding base station. The problem with the conventional process of the wireless local loop system for determining the value of the transmission distance time delay between a base station and a specific personal station is that it is performed manually. Specifically, when a technician of a network provider installs a personal station within a telephone subscriber's residence or office that is located a great distance from a base station, the technician manually measures the transmission distance that exists between the base station and that specific personal station. The technician then translates the measured transmission distance into a corresponding transmission time delay value that is compensated for within the personal station. The disadvantages associated with manually measuring the transmission distance is that (1) it requires a person to perform the actual measurement and this measurement can be error-prone and (2) it is a time consuming process. If the measurement is performed incorrectly, voice/data communication has degraded quality or will not function at all.

Therefore, it would be advantageous to provide a method and system within the wireless local loop system for determining the transmission distance time delay that exists between a base station and a personal station without manually measuring the transmission distance. Without manual measurements, the delay periods can be more accurately and efficiently measured. The present invention provides this advantage.

DISCLOSURE OF THE INVENTION

The present invention includes a method and system that performs a determination of the transmission distance time delay that exists between a base station and a personal station within a wireless local loop system. The present invention performs this determination by employing the communication interface that is utilized between the base station and the personal station. Transmission distance time delay is significant when large transmission distances (e.g., over 300 meters) are located between base stations and personal stations. Once the transmission distance time delay between a base station and a personal station is known, the personal station can compensate for it.

Specifically, the method and system of the present invention directs a base station to transmit a control signal to a personal station. The personal station receives the control signal and then transmits a data signal back to the base station. The base station receives the data signal and determines if it started to receive the data signal later than it expected the data signal to arrive, assuming the two stations were very close in proximity. If the data signal was received by the base station when it was expected to arrive, the base station discontinues determining the transmission distance time delay because no significant transmission delay exists between it and the personal station. If the data signal was received by the base station later than it was expected to arrive, the base station is directed to calculate the time difference between the expected moment in time that the data signal should have started to arrive from the personal station and the actual moment in time the data signal began to arrive. The time difference is equal to the transmission distance time delay attributed to the large distance between the base station and the personal station.

The base station transmits the transmission distance time delay to the personal station once it is determined. The personal station receives and stores the transmission distance time delay value in order to compensate for it.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, a method and system for performing an automatic transmission distance time delay setting (determination) within a wireless local loop system, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention operates within a wireless local loop system which provides its users the ability to participate in wireless voice and data communication. A wireless local loop system is usually implemented within developing countries (e.g., Thailand and China) which do not have public telephone wire network systems within many areas of the country. One of the reasons that these developing countries do not have public telephone wire network systems is that the wire used to implement the wire network can be very expensive to distribute within these countries. Instead of installing a wire public telephone network system, these developing countries install wireless local loop systems. A wireless local loop system can be implemented by using the personal handy phone system (PHS). The personal handy phone system is well known by those skilled in the art, and is discussed in a number of publications, such as Personal Handy-Phone System (PHS) Guidebook by the Ministry of Posts & Telecommunications, Japan (1995) and Personal Handy Phone System ARIB Standard Version 2 by the Association of Radio Industries and Businesses, (1995).

Figure 1A:
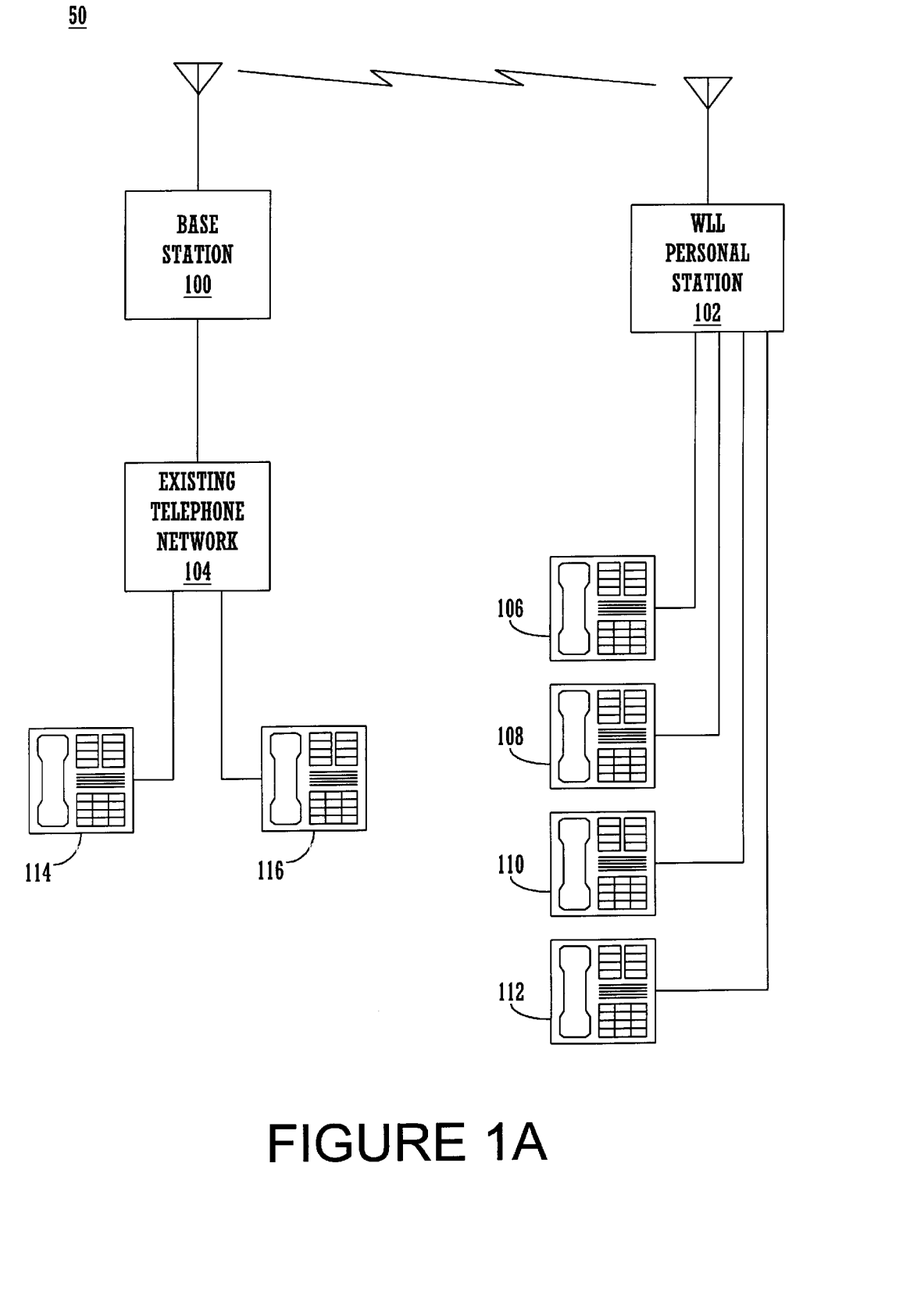
FIG. 1A illustrates a general overview of a wireless local loop system in which the present invention operates.

FIG. 1A illustrates a general overview of a wireless local loop system 50 in which the present invention operates. The main components that comprise the wireless local loop system 50 are a base station 100 and a wireless local loop personal station 102. Personal station 102 has the ability to transmit and receive voice information along with other types of data enabling the devices that are coupled to it (e.g., telephones 106–112) to communicate with base station 100. Personal station 102 usually is a fixed station that is installed at a customer's residence or office. Different types of communication devices can be coupled to personal station 102 which include telephones 106–112, a cordless telephone, a facsimile (fax) machine and a computer.

Base station 100 of FIG. 1A is a transmitter/receiver station of voice information along with other types of data and is the functional counterpart device of personal station 102. Base station 100 can be implemented by coupling it into the existing public telephone network 104. Implemented in this way, base station 100 enables the users of telephones 106–112 to communicate with the users of telephones 114 and 116, which are coupled to the existing public telephone network 104, along with users of communication devices that are coupled to other personal stations. The information that is communicated between base station 100 and personal station 102 is the same type of information that is normally transmitted and received over a public telephone wire network system. Instead of communicating over a wire network, the wireless local loop system uses a wireless radio interface to communicate information between base station 100 and personal station 102. One present invention embodiment of the radio interface used by the wireless local loop system is a time division multiple access capability with frames that are time division duplexed (TDMA-TDD) as used within the personal handy phone system.

Within one embodiment of the present invention, base station 100 of FIG. 1A and personal station 102 of the wireless local loop system are capable of communicating across a distance up to 7 kilometers. When the transmission distance between base station 100 and personal station 102 is 300 meters or less, the transmission time delay attributed to the transmitter/receiver distance can be ignored. But when the transmission distance between base station 100 and personal station 102 is greater than 300 meters, the transmission time delay attributed to the distance is compensated for within personal station 102 once it is determined using an embodiment of the present invention.

Figure 1B:
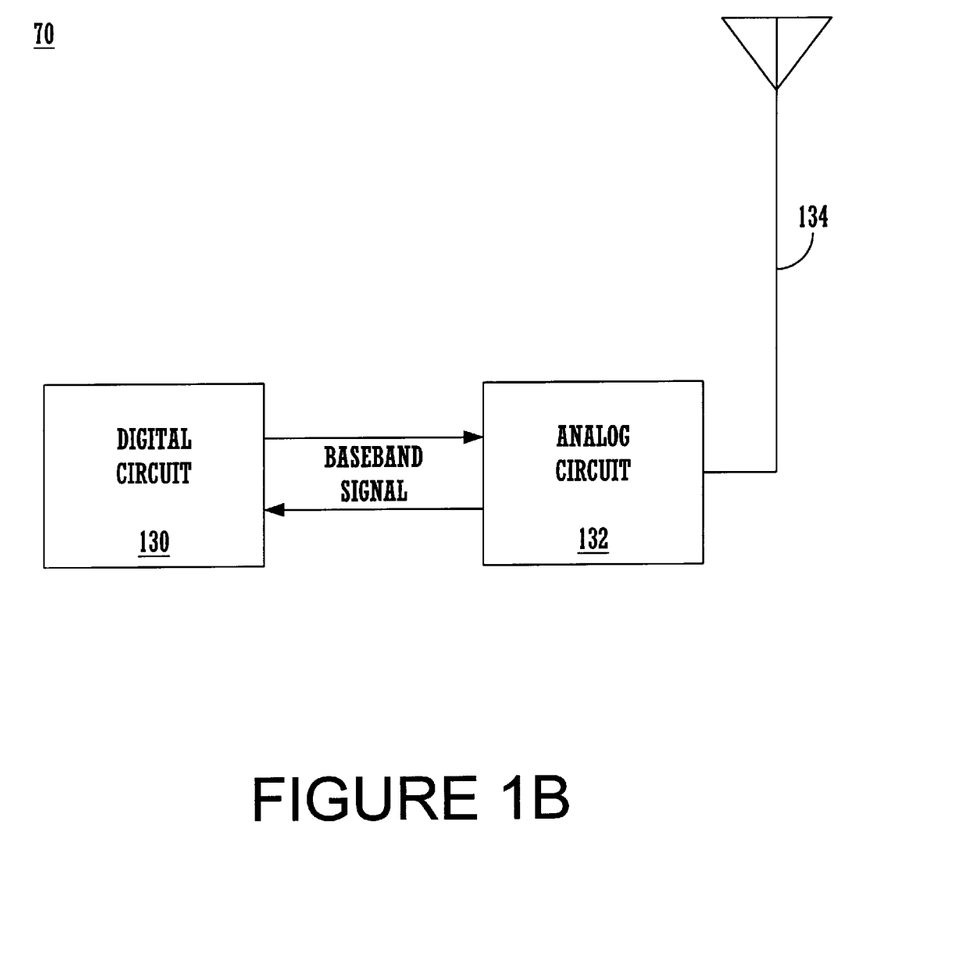
FIG. 1B illustrates a general block diagram of the circuitry coupled to the antenna within a base station and a personal station.

FIG. 1B illustrates a general block diagram of the circuitry coupled to antenna 134 located within base station 100 and personal station 102 of FIG. 1A. In order for base station 100 and personal station 102 to communicate, they need to be synchronized in the transmission and reception of data. When base station 100 and personal station 102 are synchronized within the present invention, the analog circuit 132 located within base station 100 is synchronized with the analog circuit 132 located within personal station 102. To enable both analog circuits 132 to be synchronized, the digital circuits 130 located within both stations utilize a group delay to compensate for the time it takes to perform digital to analog conversions within system 70. The group delay is equal to the amount of time digital circuit 130 needs to begin transmitting data to analog circuit 132 in order for analog circuit 132 to transmit the data at the appropriate time.

Once an embodiment of the present invention determines the transmission time delay attributed to a large distance between base station 100 of FIG. 1A and personal station 102, the measured time delay is added to the group delay of digital circuit 130 of FIG. 1B located within personal station 102. The resulting total delay value is converted into a bit delay value that is utilized by personal station 102 to pre-transmit data to base station 100.

Figure 2A:
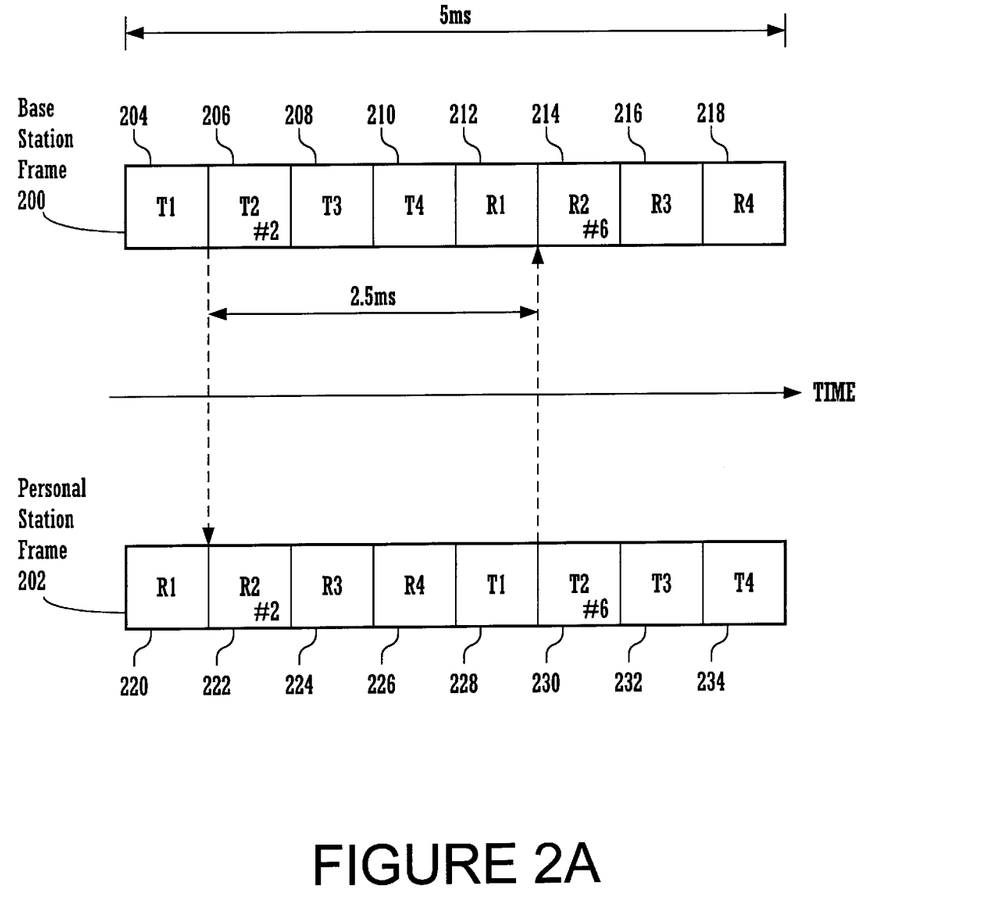
FIG. 2A illustrates one embodiment of the communication frames utilized for communication between a base station and a personal station during the operation of the present invention within a wireless local loop system.

With reference to FIG. 2A, as mentioned above one embodiment of the present invention radio communication interface within a wireless local loop system utilizes a time division multiple access capability with time division duplexing (TDMA-TDD) and this operates within the personal handy phone system. Once this digital radio interface utilized by base stations and personal stations is received and demodulated, it has a bit rate of 384 kilobits per second and is divided into 5 millisecond (ms) frames. FIG. 2A illustrates the communication frames that can be utilized for communication between personal station 102 and base station 100 of FIG. 1A during the operation of the present invention within a wireless local loop system. The organization of the transmit and receive slots within the communication frames of FIG. 2A represent how the personal handy phone system communication frames are implemented within Japan. However, the personal handy phone system standard does not limit how the transmit and receive slots are positioned within the frames used by personal station 102 and base station 100. It is possible that the slots within the frames could be organized differently, but the time between the beginning of a transmit slot and the beginning of a corresponding receiving slot should always be at least 2.5 milliseconds. The operation of these frames are described with reference to FIG. 2A in conjunction with FIG. 1A.

Personal station frame 202 of FIG. 2A represents a 5 ms frame that is utilized in reference to personal station 102 of the present invention of FIG. 1A. Base station frame 200 represents a frame that is utilized in reference to base station 100 of the present invention. Each 5 ms frame represented in FIG. 2A is divided into eight separate communication slots, each slot having a time interval of 625 microseconds. Within each frame, four of the eight slots are utilized for receiving data and four slots are utilized for transmitting data. The first four slots within personal station frame 202, slots 220–226, are utilized by personal station 102 for receiving data from base station 100 while the last four slots, slots 228–234, are utilized for transmitting data to base station 100. Conversely, the first four slots within base station frame 200, slots 204–210, are utilized by base station 100 for transmitting data to personal station 102 while the last four slots, slots 212–218, are utilized for receiving data from personal station 102.

When base station 100 of FIG. 1A and personal station 102 communicate, the slots located within personal station frame 202 of FIG. 2A operate in conjunction with the slots located within base station frame 200. For instance, during slot 206, the second transmitting slot of frame 200, base station 100 transmits a data signal to personal station 102. Personal station 102 receives the transmitted data during slot 222, the second receiving slot of frame 202, and synchronizes frame 202 to the signal transmitted to it by base station 100.

The signal transmitted by base station 100 of FIG. 1A becomes a timing reference for personal station 102. Later, during slot 230 of FIG. 2A, the second transmitting slot of frame 202, personal station 102 transmits a data signal to base station 100. Base station 100 starts to receive this transmitted data signal at least 2.5 milliseconds (e.g., the time of 4 slots) after it began transmitting data to personal station 102. Base station 100 receives this transmitted data during slot 214, the second receiving slot of frame 200. This example demonstrates that the present invention personal station 102 and base station 100 use corresponding receiving and transmitting slot positions of their respective frames as their specific communication channel or the duration of their communication session.

Figure 2B:
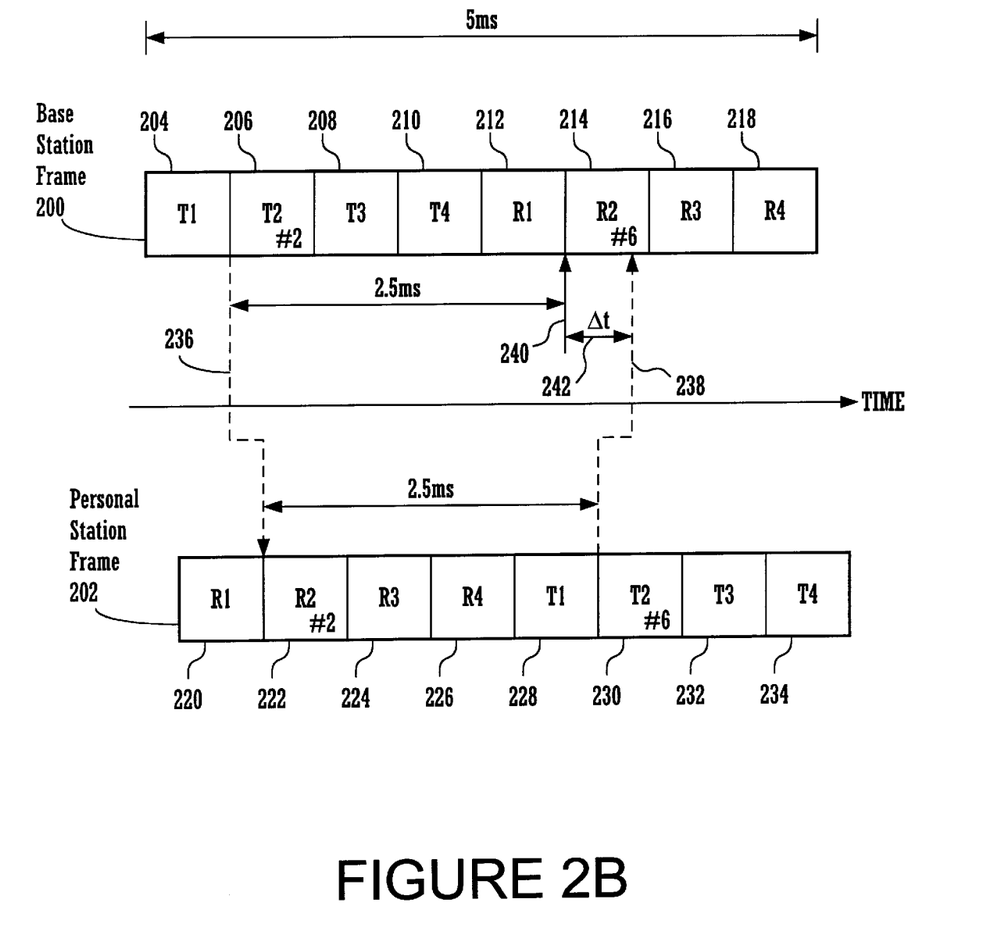
FIG. 2B illustrates an embodiment of the present invention determining the transmission time delay attributed to a large transmission distance located between a base station and a personal station using the communication frames of FIG. 2A.

FIG. 2B illustrates an embodiment of the present invention determining the transmission time delay attributed to a large transmission distance located between base station 100 of FIG. 1A and personal station 102 using the communication frames of FIG. 2A. Base station 100 transmits data signal 236 to personal station 102 during slot 206, the second transmitting slot of frame 200. Data signal 236 becomes a timing reference for personal station 102. In other words, personal station 102 synchronizes the start of slot 222, the second receiving slot of frame 202, with the beginning reception of data signal 236. Since there exists a large distance between base station 100 and personal station 102, data signal 236 takes some time to reach personal station 102 resulting in frames 200 and 202 not being aligned.

Personal station 102 of FIG. 1A commences transmitting data signal 238 of FIG. 2B to base station 100 at the beginning of slot 230, which is 2.5 milliseconds after personal station 102 started to receive data signal 236 at the beginning of slot 222. Since there exists a large distance between base station 100 and personal station 102, data signal 238 takes some time to reach base station 100 resulting in data signal 238 beginning to be received in a later part of slot 214. Base station 100 expects to receive data signal 238 at the beginning of slot 214, represented by expected reception 240. One present invention embodiment of base station 100 expects to receive data signal 238 at the beginning of slot 214, which is 2.5 milliseconds after base station 100 began transmitting data signal 236 to personal station 102. Within the prior art, base station 100 and personal station 102 are unable to continue to communicate if data signal 238 is not received at the beginning of slot 214 because the data base station 100 receives can be corrupted.

Base station 100 of FIG. 1A then determines the time of reception of data signal 238 of FIG. 2B. One present invention embodiment of base station 100 determines the time of reception of data signal 238 with 1 bit precision. Base station 100 is then directed to compute the time difference 242 between the expected reception 240 and the time of reception of data signal 238. One present invention embodiment of base station 100 computes the difference in time 242 by subtracting the bit value of the expected reception 240 from the bit value of the time of reception of data signal 238. Time difference 242 is equal to the transmission distance time delay attributed to a large distance between base station 100 and personal station 102. Time delay 242 can also be converted into a round trip transmission distance value that is located between base station 100 and personal station 102. Time delay 242 is then transfer to personal station 102 which uses it to compensate for the transmission distance time delay located between base station 100 and personal station 102.

Figure 3A:
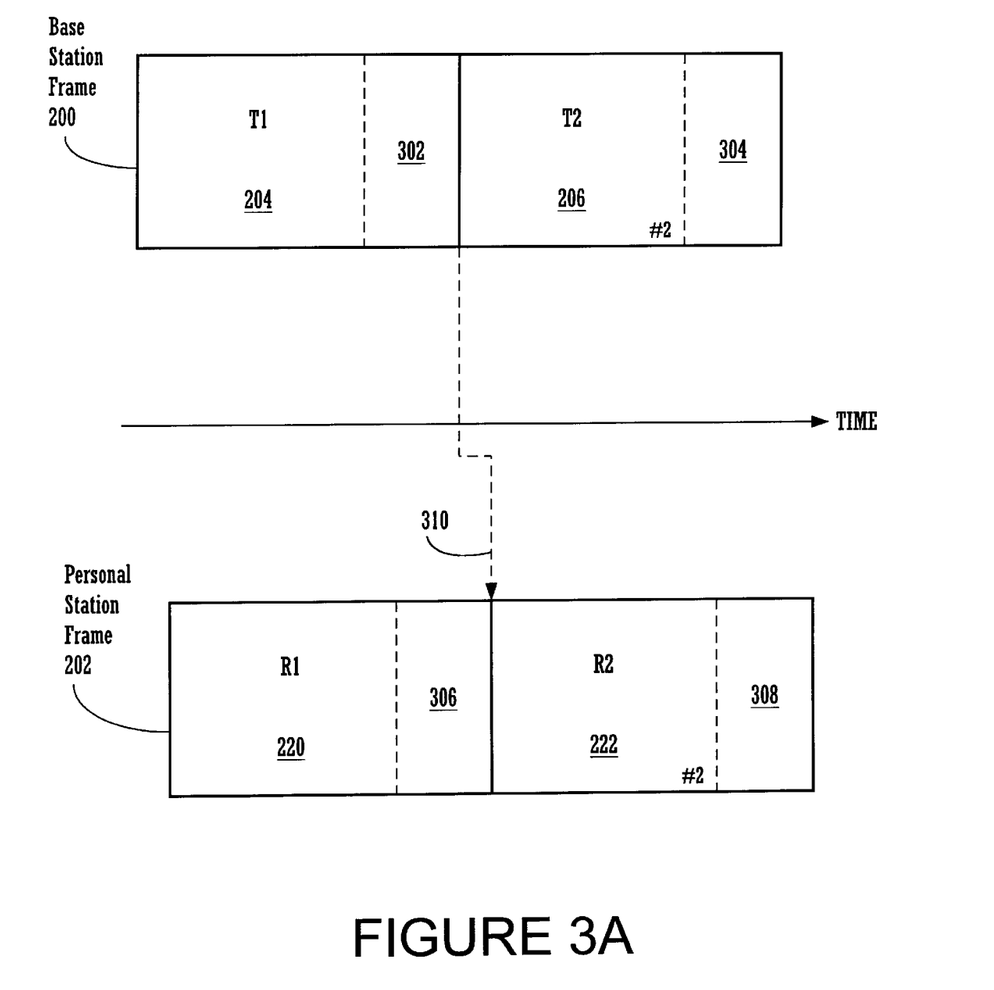
FIG. 3A illustrates a more detailed view of four communication slots located within the communication frames of FIG. 2B.

FIG. 3A illustrates a more detailed view of four communication slots located within the communication frames of FIG. 2B. Guard spaces 302, 304, 306 and 308 are each contained within slots 204, 206, 220 and 222, respectively, which are not usually used for sending or receiving data signals. When the transmission distance between base station 100 of FIG. 1A and personal station 102 is a great distance (e.g., over 300 meters), guard spaces 302–308 are unaffected by personal station 200 synchronizing frame 202 to data signal 310 within an embodiment of the present invention. For instance, base station 100 transmits data signal 310 to personal station 102 during slot 206, the second transmitting slot of frame 200. Data signal 310 becomes a timing reference for personal station 102. In other words, personal station 102 synchronizes the start of slot 222, the second receiving slot of frame 202, with the initial reception of data signal 310. Since there exists a large distance between base station 100 and personal station 102, data signal 310 takes some time to reach personal station 102 resulting in frames 200 and 202 not being aligned.

Figure 3B:
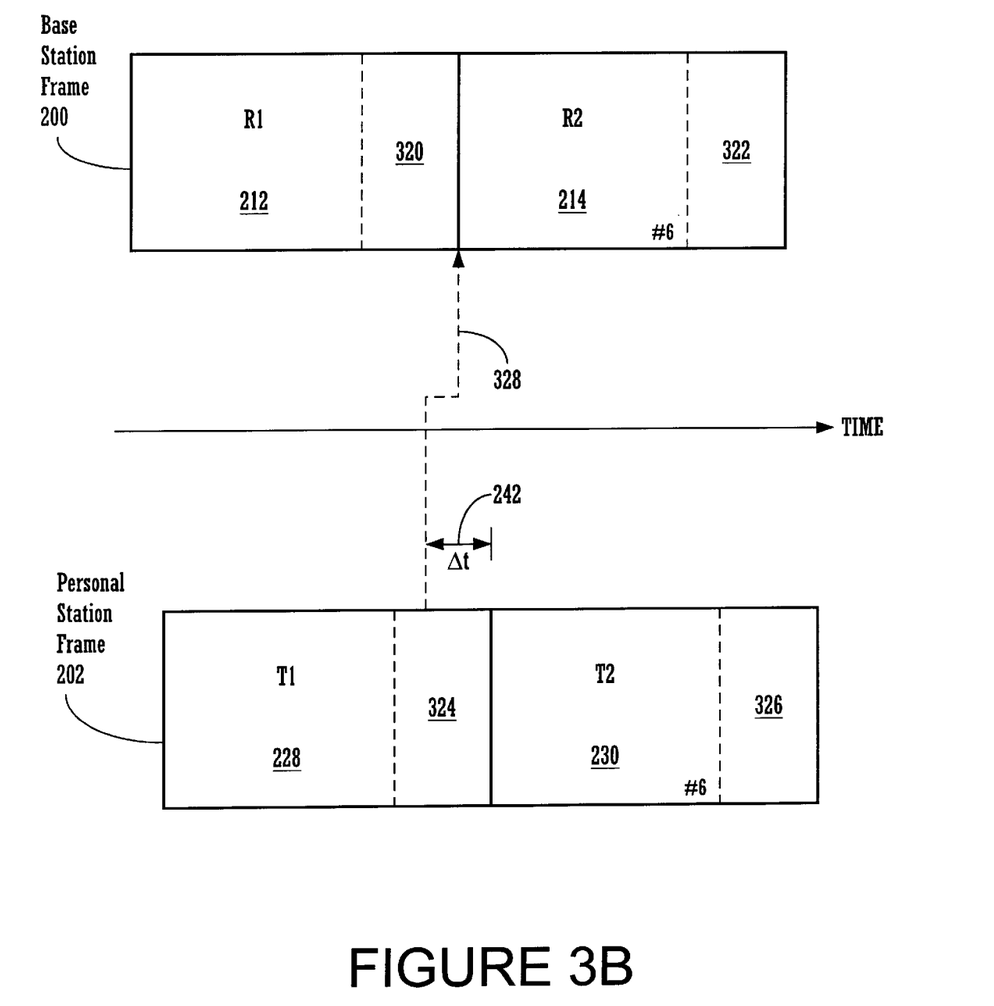
FIG. 3B shows an embodiment of the present invention compensating for transmission time delay attributed to a great distance between a base station and a personal station using the communication frames of FIG. 2B.

FIG. 3B shows an embodiment of the present invention compensating for transmission time delay attributed to a great distance between base station 100 of FIG. 1A and personal station 102 using the communication frames of FIG. 2B. Slots 212, 214, 228 and 230 of FIG. 3B each contain a guard space that is not usually used for sending or receiving data signals. One embodiment of present invention guard spaces 320–326 each contain 16 bits of data, which is included in the 240 bits of data contained within each of the present invention slots 212, 214, 228 and 230. When the transmission distance between base station 100 and personal station 102 is a great distance (e.g., over 300 meters), personal station 102 can use guard space 324 of its communication frame 202 to compensate for the transmission distance delay. If the transmission distance delay is not compensated for, the data received by base station 100 will be corrupted.

Once the transmission distance time delay between base station 100 of FIG. 1A and personal station 102 is determined by an embodiment of the present invention, personal station 102 can compensate for it. To compensate for the transmission distance time delay, personal station 102 commences to transmit a data signal 328 during guard space 324 in advance of slot 214. This is done so that, given the measured time delay 242 attributed to the transmittal/receiver distance, data signal 328 starts to be received by base station 100 at the beginning of slot 214. There are several embodiments of the present invention for determining when to commence transmitting data signal 328 during guard space 324.

To determine when to commence transmitting data signal 328 during guard space 324 of FIG. 3B, one embodiment of the present invention uses the determined bit value associated with time delay 242, which can be determined by either base station 100 of FIG. 1A or personal station 102. The determined data bit value of time delay 242 is equal to the amount of data bits that personal station 102 starts transmitting data signal 328 before the beginning of slot 230. For instance, if the determined bit value of time delay 242 is equal to seven, present invention personal station 102 starts transmitting data signal 328 within guard space 324 seven data bits before the beginning of slot 230.

One embodiment of the present invention determines when to commence transmitting a data signal during guard space 324 of FIG. 3B by utilizing the fact that given a communication rate of 384 kilobits per second, each data bit within guard space 324 compensates for approximately 2.6 microseconds of transmission time delay 242. For instance, given the determined time delay 242 is equal to 7.3 microseconds, personal station 102 of FIG. 1A or base station 100 will divide the determined time delay value 242 by 2.6 microseconds. So 7.3 microseconds is divided by 2.6 microseconds which equals 2.808. Since the resulting number of the division is not an integer, the number is rounded up to the next greater integer of 3, which is the data bit number that personal station 102 commences to transmit data signal 238 during guard space 324. In other words, personal station 102 starts transmitting data signal 328 within guard space 324 three data bits before the beginning of slot 230.

One embodiment of the present invention determines when to commence transmitting data signal 328 of FIG. 3B during guard space 324 by utilizing the fact that given a communication rate of 384 kilobits per second, each data bit within guard space 324 compensates for approximately 651 meters of transmission distance that the data travels beyond the usual distance of 300 meters. The transmission distance is determined by an embodiment of the present invention converting a determined time delay 242 into a round trip transmission distance. Once the transmission distance is determined, the present invention can determine when to commence transmitting data signal 328. First the neglected transmission distance of 300 meters is subtracted from the total round trip transmission distance. The resulting round trip transmission distance is then divided by 651 meters which results in a bit number. If the bit number is not an integer, the bit number is rounded up to the next greater integer, which results in the data bit number personal station 102 of FIG. 1A commences to transmit data signal 328 during guard space 324.

For example, if the total round trip transmission distance between base station 100 of FIG. 1A and personal station 102 is equal to 1500 meters, first the neglected transmission distance of 300 meters is subtracted from the total round trip transmission distance of 1500 meters. The resulting 1200 meters is then divided by 651 meters which results in a bit number of 1.843. Since 1.843 is not an integer, it is round up to the next greater integer of 2 which is the data bit number personal station 102 commences to transmit a data signal during guard space 324 of FIG. 3B. So personal station 102 would compensate for the transmission distance time delay 242 between it and base station 100 by commencing to transmit data signal 328 to base station 100 during the data bit of guard space 324 which is the second closest data bit to the beginning of slot 230. In other words, personal terminal 102 starts transmitting data signal 328 within guard space 324 two data bits before the beginning of slot 230.

Figure 4A:
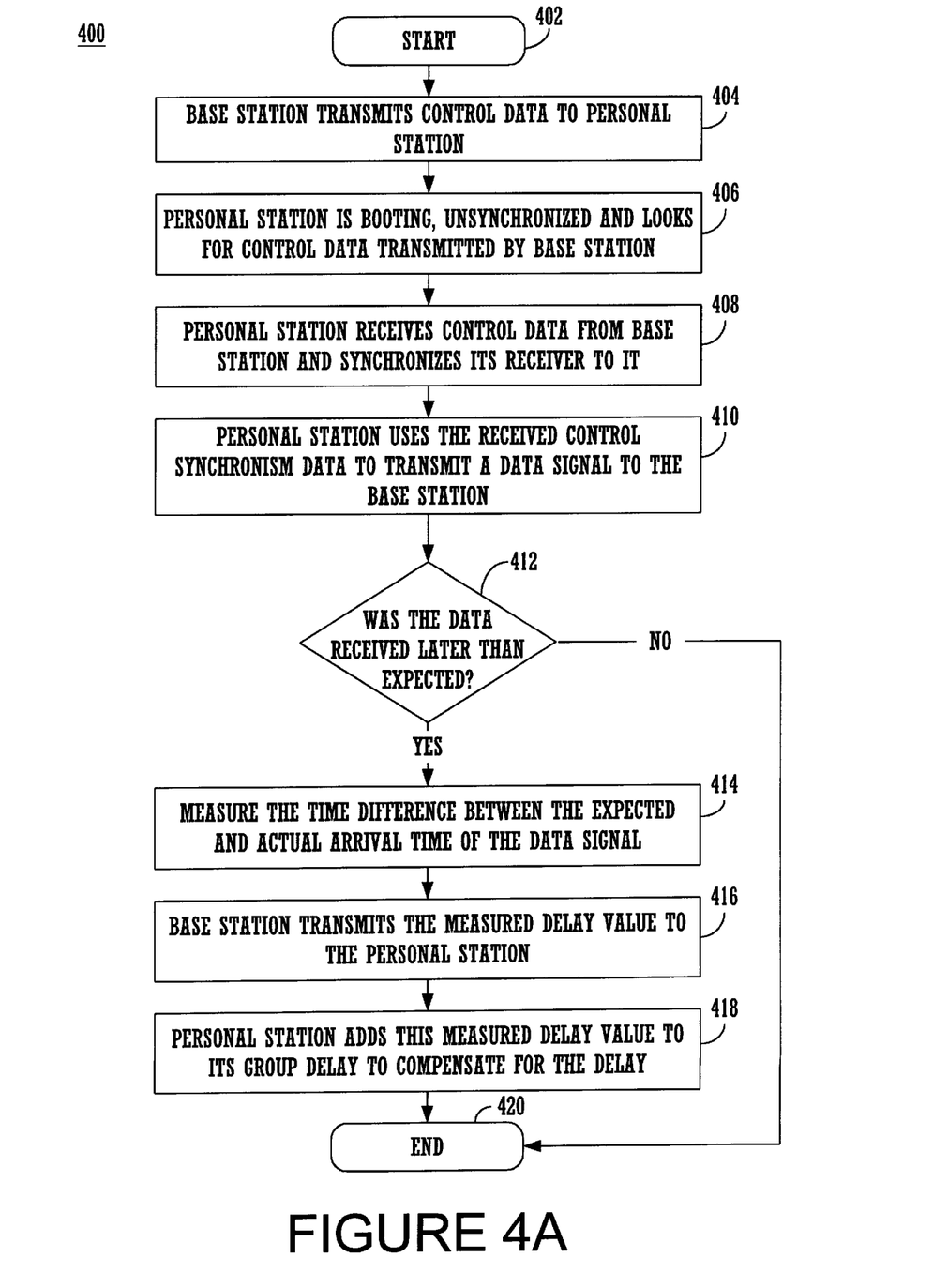
FIG. 4A shows a flowchart of a present invention method for performing an automatic transmission time delay determination attributed to a large distance between a base station and a personal station within a wireless local loop system.

FIG. 4A shows a flowchart of a method 400 of the present invention for performing an automatic transmission time delay determination attributed to the existence of a large distance between base station 100 of FIG. 1A and personal station 102 within a wireless local loop system. The transmission time delay determined by the present invention is then utilized by personal station 102 to compensate for it in the manner described above. FIG. 4A contains process 400 which starts at step 402. Step 404 directs base station 100 to transmit control data to personal station 102. Step 406 directs personal station 102, while it is booting and unsynchronized, to look for control data transmitted by base station 100. It is important to note that the order in which steps 404 and 406 are performed is interchangeable.

Once step 406 is completed, step 408 of FIG. 4A directs personal station 102 of FIG. 1A to receive the control data transmitted by base station 100 and synchronize a receiving slot to the incoming control data. Step 410 directs personal station 102 to use the received control synchronism data to transmit a data signal to base station 100. Within one embodiment of the present invention, personal station 102 transmits a data signal to base station 100 during the transmitting slot position T2 (e.g., slot 230 of FIG. 2B) that corresponds to the receiving slot position R2 (e.g., slot 222) into which the control data was received by personal station 102.

Once step 410 is completed, step 412 of FIG. 4A directs base station 100 of FIG. 1A to determine if it started to receive the transmitted data signal from personal station 102 later than it expected to receive the data signal. In one embodiment of the present invention, base station 100 expects to start receiving the data signal approximately 2.5 milliseconds (e.g., the time of 4 slots) after it began sending the control data to personal station 102 during step 404. At step 412, if the data signal was received by base station 100 when it was expected to arrive, base station 100 is directed to proceed to step 420 to exit process 400 because a significant transmission distance delay does not exist between base station 100 and personal station 102. At step 412, if the data signal was received by base station 100 later than it was expected to arrive, base station 100 is directed to proceed to step 414.

Once step 412 is completed, step 414 of FIG. 4A directs base station 100 of FIG. 1A to measure the time difference value between the expected time of reception of the data signal from personal station 102 and the actual time of reception of the data signal. Within one embodiment of the present invention, base station 100 measures the time difference with 1 bit precision. At step 414, measuring the time difference is equivalent to measuring the transmission distance time delay value.

Once step 414 is completed, step 416 of FIG. 4A directs base station 100 of FIG. 1A to transmit the measured delay value to personal station 102. Step 418 directs personal station 102 to add the measured delay value to its group delay in order to compensate for the transmission time delay attributed to the existence of a great distance between personal station 102 and base station 100. Personal station 102 and base station 100 exit process 400 at step 420.

Figure 4B:
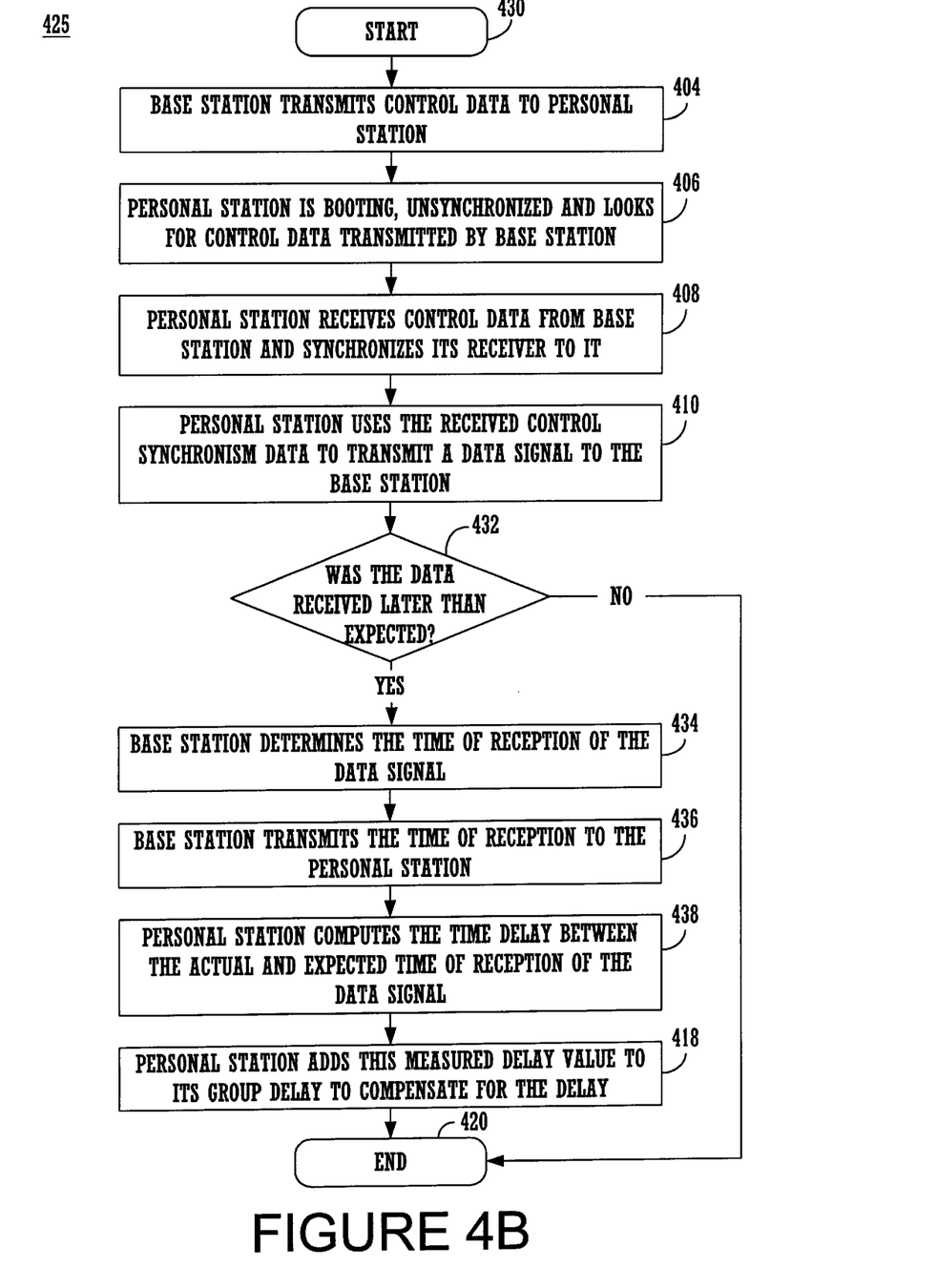
FIG. 4B shows a flowchart of a present invention method for performing an automatic transmission time delay determination attributed to a large distance between a base station and a personal station within a wireless local loop system.

FIG. 4B shows a flowchart of a method 425 of the present invention for performing an automatic transmission time delay determination attributed to the existence of a large distance between base station 100 of FIG. 1A and personal station 102 within a wireless local loop system. FIG. 4B contains process 425 which starts at step 430. Steps 404–410 of FIG. 4B are exactly the same as steps 404–410 of FIG. 4A.

Once step 410 is completed, step 432 of FIG. 4B directs base station 100 of FIG. 1A to determine if it started to receive the transmitted data signal from personal station 102 later than it expected to receive the data signal. In one embodiment of the present invention, base station 100 expects to start receiving the data signal approximately 2.5 milliseconds (e.g., the time of 4 slots) after it began sending the control data to personal station 102 during step 404. At step 432, if the data signal was received by base station 100 when it was expected to arrive, base station 100 is directed to proceed to step 420 to exit process 425 because a significant transmission distance delay does not exist between base station 100 and personal station 102. At step 432, if the data signal was received by base station 100 later than it was expected to arrive, base station 100 is directed to proceed to step 434.

Once step 432 is completed, step 434 of FIG. 4B directs base station 100 of FIG. 1A to determine the time of reception of the data signal. In one embodiment of the present invention, base station 100 measures the time of reception with 1 bit precision. Step 436 directs base station 100 to transmit the time of reception value to personal station 102. Step 438 directs personal station 102 to compute the time difference between the time of reception value and the time base station 100 had expected to receive the data signal from personal station 102. Within one embodiment of the present invention, personal station 102 measures the time difference with 1 bit precision. At step 438, measuring the time difference is equivalent to measuring the transmission distance time delay value.

Once step 438 is completed, step 418 directs personal station 102 to add the delay value to its group delay in order to compensate for the transmission time delay attributed to the existence of a great distance between personal station 102 and base station 100. Personal station 102 and base station 100 exit process 425 at step 420.

Figure 4C:
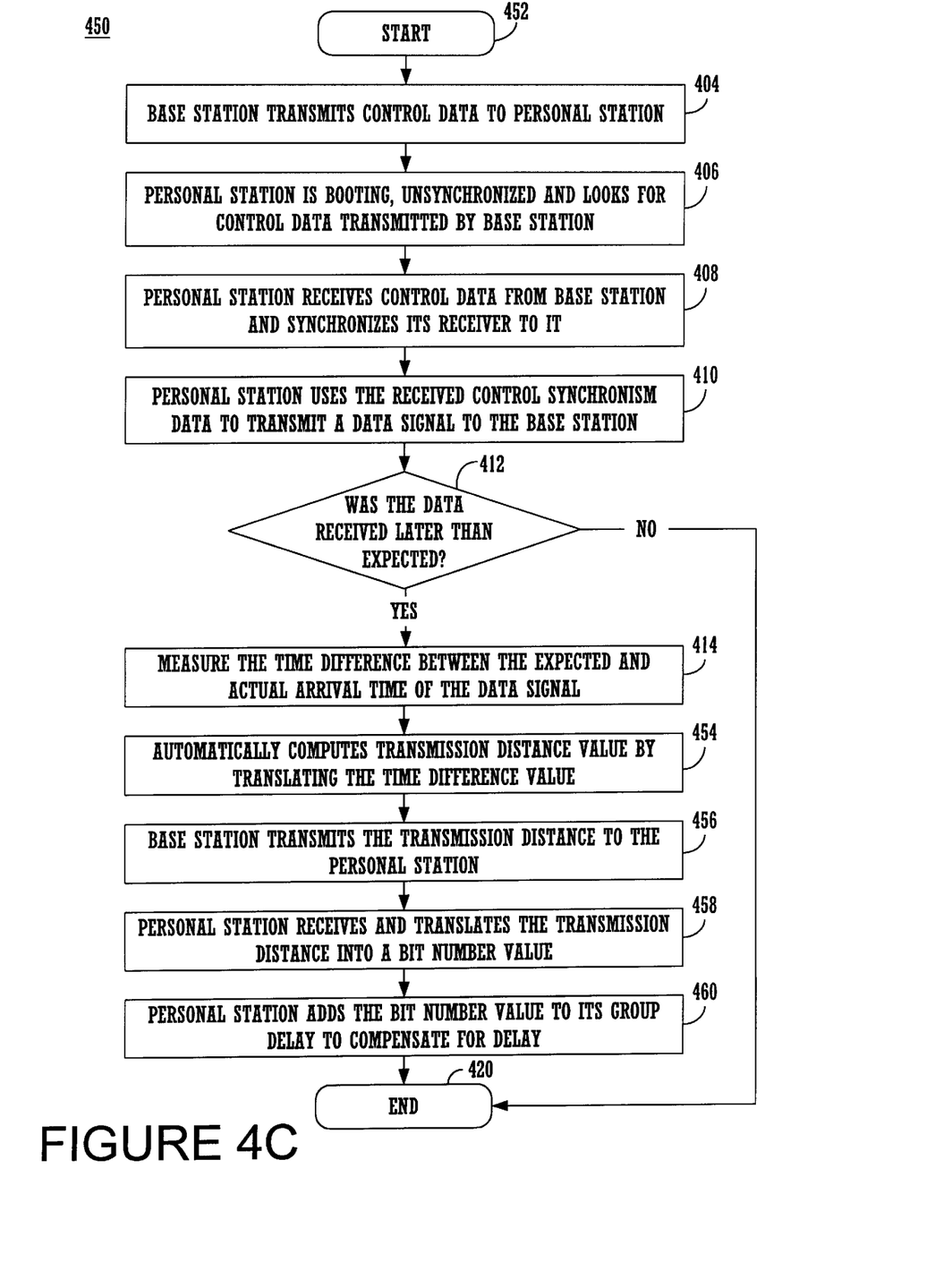
FIG. 4C shows a flowchart of a present invention method for performing an automatic round trip distance determination within a wireless local loop system in order to compensate for a transmission time delay attributed to a large distance between a base station and a personal station.

FIG. 4C shows a flowchart of a method 450 of the present invention for performing an automatic round trip distance determination between base station 100 of FIG. 1A and personal station 102 within a wireless local loop system. The round trip transmission distance determined by the present invention is then utilized by personal station 102 to compensate for the transmission time delay attributed to the existence of a large distance between base station 100 and personal station 102. FIG. 4C contains process 450 which starts at step 452. Steps 404–414 of FIG. 4C are exactly the same as steps 404–414 of FIG. 4A.

Once step 414 is completed, step 454 of FIG. 4C directs base station 100 of FIG. 1A to automatically compute the round trip transmission distance value by translating the measured time difference value. Within one embodiment of the present invention, base station 100 translates the time difference value into a round trip transmission distance value by utilizing the fact that 2.6 microseconds of time difference value is equivalent to approximately 651 meters of additional transmission distance value beyond the usual transmission distance of 300 meters. Step 456 directs base station 100 to transmit the round trip transmission distance value to personal station 102.

Once step 456 is completed, step 458 of FIG. 4C directs personal station 102 of FIG. 1A to receive and translate the round trip transmission distance value into a bit number value. Within one embodiment of the present invention, the communication rate is equal to 384 kilobits per second and personal station 102 translates the round trip transmission distance value into a bit number value by utilizing the fact that approximately 651 meters of transmission distance value beyond the usual transmission distance of 300 meters is equivalent to one bit value. Step 460 directs personal station 102 to add the determined bit number value to its group delay in order to compensate for the transmission time delay attributed to the existence of a great distance between personal station 102 and base station 100. Personal station 102 and base station 100 exit process 450 at step 420.

Figure 5:
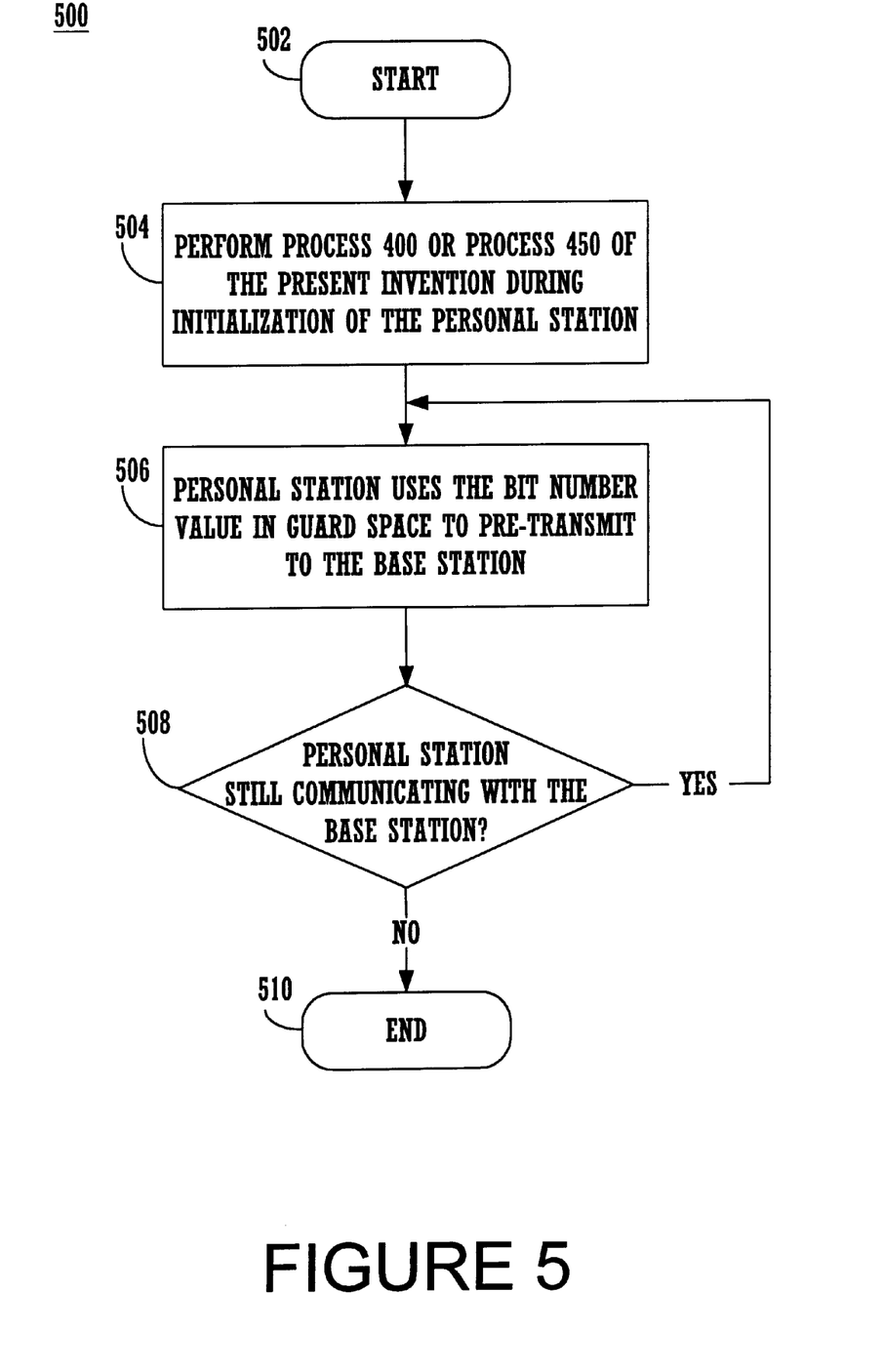
FIG. 5 shows a flowchart of a present invention method for automatically determining and compensating for the transmission time delay attributed to a large distance between a base station and a personal station.

FIG. 5 shows a flowchart of a method 500 of the present invention for automatically determining and compensating for the transmission time delay attributed to the existence of a large distance between base station 100 of FIG. 1A and personal station 102. FIG. 5 contains process 500 which starts at step 502. Step 504 directs base station 100 and personal station 102 to perform process 400 of FIG. 4A, process 425 of FIG. 4B or process 450 of FIG. 4C during the initialization of personal station 102. Step 506 directs personal station 102 to use the bit number value determined during step 504 in guard space 324 of FIG. 3B to pre-transmit data signals to base station 100. Step 508 directs personal station 102 to determine if it is still communicating with base station 100. At step 508, if the personal station 102 is still communicating with base station 100, personal station 102 is directed to proceed to step 506. At step 508, if the personal station 102 is not communicating with base station 100, personal station 102 and base station 100 are directed to proceed to step 510 to exit process 500.

When the present invention is implemented in the way described above, the determination of the transmission distance time delay between a base station and a personal station becomes an automatic task performed during the initialization process of the personal station. The present invention enables the transmission distance time delay between a base station and a personal station to be determined quickly. In fact, the present invention performs the determination of a transmission distance time delay within a matter of seconds, which results in the ability to perform a greater number of transmission distance time delay determinations in a very short time. Therefore, the present invention basically eliminates the manual labor and expenditure of time associated with the conventional manual determination of the transmission distance between a base station and a personal station to compensate for the transmission distance time delay within a wireless local loop system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for compensating for a delay attributed to a round trip distance between a base station and a personal station of a wireless local loop system, said method comprising the steps of:
   a) said base station transmitting control data to said personal station, said control data transmitted within base station transmit slots, wherein said base station and said personal station are components of a personal handy phone system and utilize a time division multiple access capability having frames that are time division duplexed wherein a single frame is approximately 5 milliseconds and contains eight communication slots;
   b) said personal station, in an unsynchronized state, receiving control data and synchronizing a personal station receive slot thereto;
   c) said personal station transmitting a signal, during a subsequent personal station transmit slot, to said base station;
   d) said base station computing a delay between the time of reception of said signal by said base station and an expected time of reception, said expected time of reception being the start time of a base station receive slot that corresponds to said personal station transmit slot;
   e) transmitting said delay to said personal station; and
   f) said personal station using said delay to transmit information in advance of personal station transmit slots to compensate for said round trip distance in subsequent communications between said personal station and said base station, wherein said step f) comprises the step of adding said delay to an existing group delay used by said personal station.

2. A method as described in claim 1 wherein step f) comprises the step of transmitting information within guard bits of slots preceding said personal station transmit slots, wherein one guard bit is used in advance of a personal station transmit slot for each 651 meters of said round trip distance.

3. A method as described in claim 1 wherein step f) comprises the step of transmitting information within guard bits of slots preceding said personal station transmit slots, wherein one guard bit is used in advance of a personal station transmit slot for each 2.6 microseconds of said delay.

4. A method as described in claim 1 wherein said expected time of reception by said base station is approximately 2.5 milliseconds after said base station began to transmit said control data to said personal station.

5. A method for compensating for a delay attributed to a round trip distance between a base station and a personal station of a wireless local loop system, said method comprising the steps of:
   a) said base station transmitting control data to said personal station, said control data transmitted within base station transmit slots, wherein said base station and said personal station utilize a time division multiple access capability having frames that are time division duplexed wherein a single frame is approximately 5 milliseconds and contains eight communication slots;
   b) said personal station, in an unsynchronized state, receiving control data and synchronizing a personal station receive slot thereto;
   c) said personal station transmitting a signal, during a subsequent personal station transmit slot, to said base station;
   d) said base station computing a delay between the time of reception of said signal by said base station and an expected time of reception, said expected time of reception being the start time of a base station receive slot that corresponds to said personal station transmit slot, wherein said expected time of reception by said base station is approximately 2.5 milliseconds after said base station began to transmit said control data to said personal station;
   e) transmitting said delay to said personal station; and
   f) said personal station using said delay to start transmitting information within guard bits of personal station slots that precede personal station transmit slots to compensate for said round trip distance in subsequent communications between said personal station and said base station.

6. A method as described in claim 5 wherein said base station and said personal station are components of a personal handy phone system.

7. A method as described in claim 5 wherein said base station and said personal station communicate at approximately 384 kilobits per second and wherein step f) uses one guard bit in advance of a personal station transmit slot for each 2.6 microseconds of said delay.

8. A method for compensating for a delay attributed to a round trip distance between a base station and a personal station of a wireless local loop system, said method comprising the steps of:
   a) said base station transmitting control data to said personal station, said control data transmitted within base station transmit slots;
   b) said personal station, in an unsynchronized state, receiving control data and synchronizing a personal station receive slot thereto;
   c) said personal station transmitting a signal, during a subsequent personal station transmit slot, to said base station;
   d) said base station determining the time of reception of said signal by said base station;
   e) transmitting said time of reception to said personal station;
   f) said personal station computing a delay between said time of reception and an expected time of reception, said expected time of reception being the start time of a base station receive slot that corresponds to said personal station transmit slot,
   wherein said expected time of reception by said base station is approximately 2.5 milliseconds after said base station began to transmit said control data to said personal station; and
   g) said personal station using said delay to transmit information in advance of personal station transmit slots to compensate for said round trip distance in subsequent communications between said personal station and said base station.

9. A method as described in claim 8 wherein said base station and said personal station utilize a time division multiple access capability having frames that are time division duplexed wherein a single frame is approximately 5 milliseconds and contains eight communication slots.

10. A method for automatically determining round trip distance between a base station and a personal station of a wireless local loop system, said method comprising the steps of:

a) said base station transmitting control data to said personal station, said control data transmitted within base station transmit slots;

b) said personal station, in an unsynchronized state, receiving control data and synchronizing a personal station receive slot thereto;

c) said personal station transmitting a signal, during a subsequent personal station transmit slot, to said base station;

d) said base station computing a delay between the time of reception of said signal by said base station and an expected time of reception, said expected time of reception being the start time of a base station receive slot that corresponds to said personal station transmit slot;

e) translating said delay into said round trip distance between said base station and said personal station, and recording said round trip distance;

f) transmitting said round trip distance to said personal station; and g) said personal station using said round trip distance to transmit information in advance of personal station transmit slots to compensate for said delay in subsequent communications between said personal station and said base station.

11. A method as described in claim 10 wherein said base station and said personal station utilize a time division multiple access capability having frames that are time division duplexed wherein a single frame is approximately 5 milliseconds and contains eight communication slots.

12. A method as described in claim 11 wherein said base station and said personal station are components of a personal handy phone system.

13. A method as described in claim 10 wherein said step e) comprises the step of determining said round trip distance according to a relationship wherein 2.6 microseconds of said delay corresponds to 651 meters of round trip distance.

14. A method as described in claim 10 wherein said expected time of reception by said base station is approximately 2.5 milliseconds after said base station began to transmit said control data to said personal station.

15. A method as described in claim 10 wherein step g) comprises the step of transmitting information within guard bits of slots preceding said personal station transmit slots, wherein one guard bit is used for each 651 meters of said round trip distance.

* * * * *